United States Patent [19]

Mason et al.

[11] 4,016,237
[45] Apr. 5, 1977

[54] PROCESS FOR SEPARATION OF THE RARE EARTHS BY SOLVENT EXTRACTION

[75] Inventors: George W. Mason, Clarendon Hills; Sonia Lewey, Joliet, both of Ill.

[73] Assignee: The United States of America as represented by the United States Energy Research and Development Administration, Washington, D.C.

[22] Filed: Sept. 8, 1975

[21] Appl. No.: 611,272

[52] U.S. Cl. .................... 423/21; 75/101 BE; 423/658.5
[51] Int. Cl.² .................... C01F 17/00
[58] Field of Search .......... 423/21, 10, 658.5; 75/101 BE

[56] References Cited

UNITED STATES PATENTS

| | | | |
|---|---|---|---|
| 2,955,913 | 11/1960 | Peppard et al. | 423/21 |
| 3,110,556 | 11/1963 | Peppard et al. | 423/21 |
| 3,524,723 | 8/1970 | Millsap et al. | 423/21 |

OTHER PUBLICATIONS

Marcus et al., "Ion Exchange & Solvent Extraction of Metal Complexes", Wiley–Interscience, N.Y., 1969, pp. 521–526.
Levin et al., "Chemical Abstracts", vol. 79, 1973, No. 108604v.
Tukhin et al., "Chemical Abstracts", vol. 83, 1975, No. 21544j.

Primary Examiner—Herbert T. Carter
Attorney, Agent, or Firm—Dean E. Carlson; Arthur A. Churm; James W. Weinberger

[57] ABSTRACT

Production rates for solvent extraction separation of the rare earths and yttrium from each other can be improved by the substitution of di(2-ethylhexyl) monothiophosphoric acid for di(2-ethylhexyl) phosphoric acid. The di(2-ethylhexyl) mono-thiophosphoric acid does not form an insoluble polymer at approximately 50% saturation as does the former extractant, permitting higher feed solution concentration and thus greater throughput.

5 Claims, 1 Drawing Figure

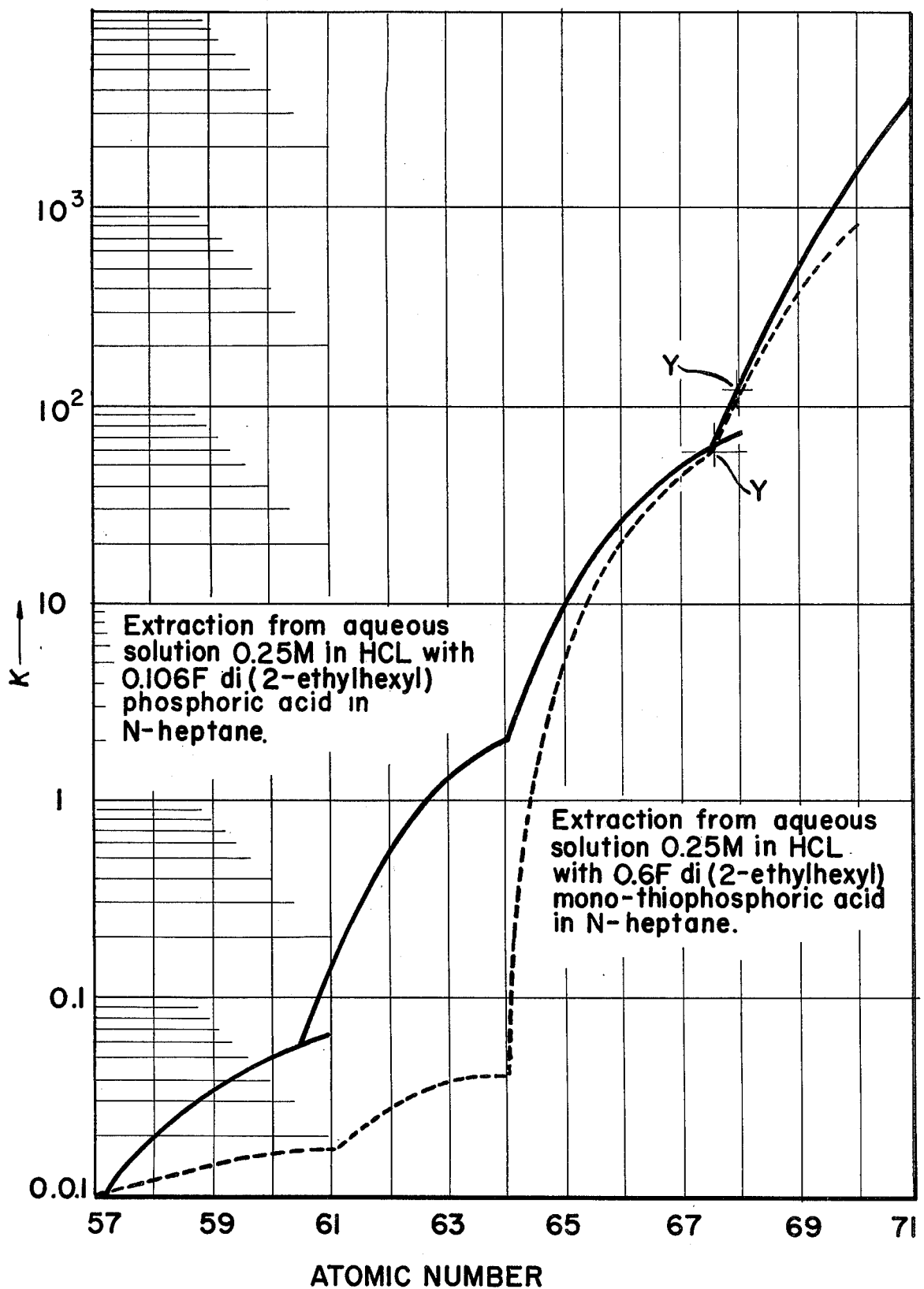

PROCESS FOR SEPARATION OF THE RARE EARTHS BY SOLVENT EXTRACTION

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to the separation of rare earths and more specifically to an improvement in the method for separation of the various earths and yttrium from each other by solvent extraction. The separation of the rare earths and yttrium from each other in order to obtain them in their pure state has been a difficult process in the past because the chemical and physical properties of the rare earths are so similar. Since yttrium is found and extracted along with the rare earths, this element is included hereinafter in the term "rare earths". One early process which permitted separation of the rare earths by solvent extraction is described in U.S. Pat. No. 2,955,913 which issued Oct. 11, 1960. In this process, it is disclosed that, when a concentrated mineral acid solution containing a plurality of rare earths is contacted with water-immiscible alkyl phosphates such as tributyl phosphate, extraction occurs for various rare earths in various degrees, the extraction increasing with increasing atomic number and increasing atomic weight, the yttrium extracting as if it had an atomic number between 66 and 67. However, the extractability values of the various rare earths in this process are rather close together so that many extraction and back-extraction cycles are required to achieve good separation between the various rare earths.

An improvement in the aforementioned process is described in U.S. Pat. No. 3,110,556, Nov. 12, 1963, in which a dialkyl phosphoric acid was shown to have greater separation extractability values for the rare earths and yttrium. The dialkyl phosphoric acid which showed the greatest promise and which has attained widespread acceptance for separation of the rare earths is di(2-ethylhexyl) phosphoric acid (referred to hereinafter as HDEHP). However, one major limitation with the use of HDEHP as an extractant for the rare earths and yttrium is gelation or the formation of insoluble polymers at approximately 50% saturation. The gelation which takes place has the effect of preventing the separation of the aqueous and organic phases, thus making the process impossible to operate. Thus gelation of the HDEHP necessitates that the concentration of rare earths in the aqueous mineral acid feed solution be severely limited to only a fraction of what they might be otherwise, reducing the efficiency of the separation process, lowering the throughput and consequently increasing the total cost of the rare earths recovered.

Another difficulty attendant with the use of HDEHP is that it has such a strong affinity for the higher atomic number rare earths that unless only a relatively low concentration of the extractant is used, it is difficult or impossible to re-extract or strip some of the elements from the solution.

SUMMARY OF THE INVENTION

We have discovered that, by substituting di(2-ethylhexyl) mono-thiophosphoric acid (hereinafter referred to as $(EHO)_2(POSH)$ for the HDEHP of the present process, it is possible to saturate the extractant without any gelation, thus eliminating the necessity of limiting the concentration of rare earths in the feed solution, so that the organic extractant will be no more than 50% saturated after the first contact. We have also discovered that we can use higher concentrations of $(EHO)_2$-POSH in our extraction solution and still strip the higher atomic number rare earths without difficulty.

By the method of our invention for the separation of the rare earths and yttrium from each other, an aqueous hydrochloric acid feed solution containing a plurality of rare earths and yttrium is contacted with a substantially water-immiscible organic extractant of $(EHO)_2POSH$ in an organic diluent whereby the rare earths having the highest atomic number are preferentially extracted and the extractability decreases in the decreasing order of the atomic number, and contacting the organic extractant with a plurality of aqueous hydrochloric acid solutions whereby fractions of aqueous rare earth solutions are formed and collecting each fraction separately.

It is therefore the object of the invention to provide an improvement in the method for the separation of the rare earths and yttrium from each other.

DESCRIPTION OF THE DRAWING

The drawing shows the function of extractability of the various rare earths and their atomic number (a) with a N-heptane solution of di(2-ethylhexyl) phosphoric acid from an aqueous hydrochloric acid solution and (b) a N-heptane solution of di(2-ethylhexyl) mono-thiophosphoric acid from an aqueous hydrochloric acid solution.

DESCRIPTION OF THE PREFERRED EMBODIMENT

This and other objects of the invention may be met by contacting an aqueous feed solution which is about 0.25 M in hydrochloric acid and containing a plurality of rare earths and yttrium elements with an organic extractant of about 0.6 F $(EHO)_2POSH$ in a water-immiscible organic diluent, whereby the rare earth and yttrium elements are selectively extracted into the organic extractant, the amount increasing with the increasing atomic number and the extractability of the elements into the organic extractant decreasing with decreasing atomic number, and contacting the organic extractant with a plurality of aqueous hydrochloric acid solutions whereby fractions of aqueous rare earth solutions are formed and collecting each fraction separately.

In this process for rare earth and yttrium extraction, the function between the atomic number of the various elements and the distribution coefficient "K" which is the ratio of concentration in the organic phase to the concentration in the aqueous phase are represented by a series of four curved lines. In the accompanying drawing, two series of curves are shown, one for the prior art HDEHP and one for the extractant of the present invention, $(EHO)_2POSH$. Yttrium can be incorporated on these curves if it is given an artificial atomic number of 67.5

The extractions must be carried out from a nonoxidizing mineral acid solution such as hydrochloric acid, since strong oxidizing acids will decompose the extractant. The acid concentration of the feed and scrub solutions may vary from about 0.1 to about 2.0 M in HCl. There is no practicable limit as to the concentration of the rare earths in the aqueous feed solution except for the limitation of their own solubility.

The water-immiscible organic diluent may be any organic solvent in which the (EHO)$_2$POSH is soluble and which is immiscible with the aqueous phase. Thus the diluent may be any alkyl or aryl hydrocarbon such as benzene, heptane, toluene or xylene or it can be carbon tetrachloride. The concentration of the extractant in the diluent may vary widely and may range up to at least 1.0 F. The concentration unit, formality, F, is defined as the number of formula weights per liter of solution and is used throughout this description of the invention for clarity.

It was found that there exists a direct 2 1/2 power dependency between the concentration of the extractant in normal heptane and the distribution coefficient K and an inverse third power dependency between the acid concentration in the equilibrated aqueous phase and K. This relationship is true for all of the rare earths and yttrium.

The rare earth values extracted into the organic extractant are back-extracted or stripped by contact with the mineral acid. A hydrochloric acid solution of between 5 and 6 M will give the best results.

The process of this invention can be carried out by using batch or continuous methods, a countercurrent flow being preferably used for the latter. Operation of the extraction process in an extraction column is particularly advantageous.

While the separation factors attainable with (EHO)$_2$POSH are similar to separation factors attainable with HDEHP, the process is exceptionally efficient for the separation of the rare earths having atomic numbers of 64 and higher. Since higher concentrations of rare earth elements in the feed solution can now be used, it is estimated that the use of (EHO)$_2$POSH would give an improvement in the separation of rare earths by a minimum factor of 2 over the present separation process.

The following example is given as illustrative of the process of the invention and is not to be taken as limiting the scope or extent of the invention.

EXAMPLE

The feed solution is a mixture of rare earth chlorides dissolved in 2 M HCl and containing 40 mg per ml each of gadolinium, dysprosium, holmium, erbium, yttrium, thulium and ytterbium. The extractant is 0.6 F di(2-ethylhexyl) mono-thiophosphoric acid, (EHO)$_2$POSH, dissolved in benzene. The aqueous scrub is 0.2 M HCl. A 5-stage countercurrent extraction process, employing five extractors set up in series, is used. The feed is introduced in the third (center) extractor, the aqueous 0.2 M HCl scrub solution in the first extractor and the extractant solvent in the fifth extractor. The quantities used for feed, scrub and extractant phase are 50 microliters, 2 ml and 2 ml, respectively. Each contact consists of three minutes for mixing and three minutes for settling. The aqueous phases are transferred to the next following extractor, while the organic phases are transferred in each case to the preceding extractor. The aqueous phase leaving contactor No. 5 and the organic phase leaving contactor No. 1 are the "aqueous product solution" and the "organic product solution", respectively. The rare earths are scrubbed from the organic product solution with two half volume portions of 2 M HCl. The composition of the feed (diluted by a factor of 40), the third aqueous product solution and the third organic product solution in micrograms per ml is shown in the table below.

TABLE

|  | Gd | Dy | Ho | Y | Er | Tm | Yb |
|---|---|---|---|---|---|---|---|
| Feed | 1000 | 1000 | 1000 | 1000 | 1000 | 1000 | 1000 |
| Organic product | 22 | 60 | 140 | 520 | 680 | 870 | 950 |
| Aqueous product | 800 | 500 | 320 | 50 | 18 | 10 | 2 |

As can be seen from the preceding description and example, the process of this invention is an improvement over the prior art process. This process permits the use of substantially higher feed solution concentrations and extractant concentrations while retaining almost the same extractability factors as HDEHP, thus providing the possibility of greatly improved production rates for the separation of the rare earths and yttrium from each other.

The embodiments of the invention in which an exclusive property or privilege is claimed are difined as follows:

1. In the method for separating rare earth and yttrium elements from each other by contacting an aqueous mineral acid feed solution containing a plurality of rare earths and yttrium with a plurality of solutions of an organic extractant in a water-immiscible organic diluent whereby the elements having the highest atomic number are preferentially extracted from the feed solution and the extractability of the elements decreases with decreasing order of atomic number, contacting the extractant with a plurality of aqueous mineral acid scrub solutions whereby the rare earths are separated into fractions in the aqueous and organic solutions according to their atomic number, the lower atomic number elements preferentially concentrating in the scrub solutions in decreasing order of their atomic number and the higher atomic number elements preferentially concentrating in the organic extractant solutions in increasing order of their atomic number and collecting each fraction separately, the improvement wherein the feed and scrub solutions are 0.1 to 2.0 M in a nonoxidizing mineral acid and the organic extractant is up to 1.0 F di(2-ethylhexyl) mono-thiophosphoric acid in a water-immiscible organic diluent whereby higher concentrations of rare earth and yttrium elements are extracted from the feed solution without forming an insoluble polymer with the extractant.

2. The method of claim 1 wherein the mineral acid is hydrochloric acid.

3. The method of claim 2 wherein the organic diluent contains about 0.6 F di(2-ethylhexyl) mono-thiosphosphoric acid.

4. The method of claim 3 wherein the organic diluent is selected from the group consisting of benzene, heptane, toluene, xylene and carbon tetrachloride.

5. The method of claim 4 wherein the rare earth fractions in the organic extractant are back extracted with 5 to 6 M hydrochloric acid solution.

* * * * *